United States Patent
Freyhult et al.

(10) Patent No.: US 9,201,566 B2
(45) Date of Patent: *Dec. 1, 2015

(54) PRESENTATION OF IMAGE ON DISPLAY SCREEN WITH COMBINATION CROP AND ROTATION AND WITH AUTO-RESIZING OF CROP FIELD

(71) Applicant: BlackBerry Limited, Waterloo (CA)

(72) Inventors: Maria Christina Nathalie Freyhult, Malmo (SE); Nils Johan Petter Montan, Malmo (SE); Rikard Samvik, Lund (SE)

(73) Assignee: BlackBerry Limited, Waterloo, Ontario (CA)

(*) Notice: Subject to any disclaimer, the term of this patent is extended or adjusted under 35 U.S.C. 154(b) by 121 days.

This patent is subject to a terminal disclaimer.

(21) Appl. No.: 14/168,184

(22) Filed: Jan. 30, 2014

(65) Prior Publication Data

US 2014/0149928 A1    May 29, 2014

Related U.S. Application Data

(63) Continuation of application No. 13/661,328, filed on Oct. 26, 2012, now Pat. No. 8,671,361.

(60) Provisional application No. 61/651,187, filed on May 24, 2012.

(51) Int. Cl.
  *G06F 3/048* (2013.01)
  *G06F 3/0481* (2013.01)
  *G06F 3/0488* (2013.01)

(52) U.S. Cl.
  CPC .......... *G06F 3/0481* (2013.01); *G06F 3/04883* (2013.01)

(58) Field of Classification Search
  None
  See application file for complete search history.

(56) References Cited

U.S. PATENT DOCUMENTS

| | | | | |
|---|---|---|---|---|
| 7,453,444 | B2* | 11/2008 | Geaghan | 345/173 |
| 2006/0001650 | A1* | 1/2006 | Robbins et al. | 345/173 |
| 2006/0170669 | A1* | 8/2006 | Walker et al. | 345/418 |
| 2008/0036743 | A1* | 2/2008 | Westerman et al. | 345/173 |
| 2008/0282202 | A1* | 11/2008 | Sunday | 715/863 |
| 2009/0080801 | A1* | 3/2009 | Hatfield et al. | 382/253 |
| 2009/0259967 | A1* | 10/2009 | Davidson et al. | 715/799 |
| 2010/0090971 | A1* | 4/2010 | Choi et al. | 345/173 |
| 2010/0107081 | A1* | 4/2010 | Benenson | 715/730 |
| 2010/0149211 | A1* | 6/2010 | Tossing et al. | 345/628 |
| 2010/0156931 | A1* | 6/2010 | Boreham et al. | 345/621 |
| 2010/0171712 | A1* | 7/2010 | Cieplinski et al. | 345/173 |
| 2011/0013049 | A1* | 1/2011 | Thorn | 348/240.3 |
| 2011/0074827 | A1 | 3/2011 | Griffin et al. | |
| 2011/0234503 | A1* | 9/2011 | Fitzmaurice et al. | 345/173 |
| 2013/0016122 | A1* | 1/2013 | Bhatt et al. | 345/620 |
| 2013/0033448 | A1* | 2/2013 | Yano et al. | 345/173 |

* cited by examiner

*Primary Examiner* — Matt Kim
*Assistant Examiner* — Mahelet Shiberou
(74) *Attorney, Agent, or Firm* — Jose Gutman; Fleit Gibbons Gutman Bongini & Bianco P.L.

(57) ABSTRACT

A portable electronic device, computer program product, and method of presenting image information on a display with combined cropping and rotation selection and auto-resizing of cropped portion of the displayed image. A processor accepts a selection of a portion of a displayed image in a selection rectangle frame over the displayed image, based on detecting a first gesture. The processor determines a request for rotation of the displayed selection rectangle frame based on detecting a second gesture. The processor then rotates the selection rectangle frame on the displayed image and resizes the selection rectangle frame while maintaining it within the outer boundaries of the displayed image.

20 Claims, 13 Drawing Sheets

PRESENTATION OF IMAGE ON DISPLAY SCREEN WITH COMBINATION CROP AND ROTATION AND WITH AUTO-RESIZING OF CROP FIELD

CROSS-REFERENCE TO RELATED APPLICATION

This application claims priority from U.S. patent application Ser. No. 13/661,328 filed on Oct. 26, 2012, which claims priority from U.S. Provisional Patent Application No. 61/651,187 filed on May 24, 2012, the collective disclosure of which being hereby incorporated by reference in its entirety.

FIELD OF THE DISCLOSURE

The present disclosure generally relates to graphical user interfaces and more particularly to presentation of cropping, rotation, and re-sizing of images on a graphical user interface.

BACKGROUND

Many information processing systems and information display applications present image information on a graphical user interface. Examples of such information display applications include picture editors and the like. In applications operating with a user interface comprising a small display screen such as in a mobile device environment, or even in applications operating with a larger display screen by using a small display window area within the larger display screen, generally have a constrained display screen area that limits the amount of image information that can be presented to a user at one time.

Certain conventional picture editors (or image editors) allow a user to selectively crop a portion of an image displayed on a display screen. In some picture editors an image on a display screen can be rotated. Additionally, some picture editors allow changing the direction of rotation of an image on a display screen. This rotation is achieved in all these examples by rotating the image on the display screen beneath a fixed rectangular image frame. Typically a display screen, or a window in a display screen, is presented in a user interface as a rectangular form factor picture frame. An example of this is shown in FIG. 1 with an image in the fixed rectangular picture frame.

In some picture editors, this rotation can be problematic because, in performing the rotation of a displayed image, parts of the image being rotated are not displayed because they fall outside the fixed rectangular picture frame (or also referred to as "image frame"). This constraint can lead to important parts or details of the image being missed from the picture frame. In the example shown in FIG. 1, when the image is rotated left, as shown in FIG. 2, or rotated right, as shown in FIG. 3, parts of the originally displayed image are undesirably missed from the displayed fixed rectangular picture frame.

In other picture editors, rather than cut parts of the image out it is known to add corner sections (white or gray space) as shown in FIG. 4.

While rotating the image, especially at any angle other than 90 degrees, it is very likely that the rotated image either has undesirably added white/gray background space beyond the dimensions of the original image being rotated or the image is undesirably cropped. This is because the operational environment for these editors typically only stores image information in a rectangular matrix.

Therefore, there is a need to address these problems with conventional information processing systems and conventional information display applications that present image information on a graphical user interface and that allow cropping and rotation of displayed image information.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to"

describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function According to various embodiments of the present disclosure, a selection rectangle frame (or selection frame) can be rotated over a displayed image, rather than rotating the displayed image underneath the selection frame. This selection rectangle frame has the effect of controlling the cropping of a portion of the displayed image and the rotation of the displayed image in one control operation. According to certain embodiments, the size of the selection frame is dynamically changed while rotating the selection frame based on the boundaries of the original displayed image (e.g., defined by a display frame around the displayed image) on the display screen and the original size of the selection frame. Further, when a portion of a displayed image is cropped and optionally rotated, it can then be set to the current displayed image (e.g., filling the display frame around the current displayed image), and thereafter further selection of a portion of the current displayed image, and optional rotation thereof, is based on the previously cropped, and optionally rotated, portion of a displayed image (e.g., the current displayed image filling the display frame). This process can be repeated recursively allowing a user flexibility in performing combinations of image crop with optional image rotate operations with very natural and intuitive manual gestures such as on a display screen.

Figure 1:
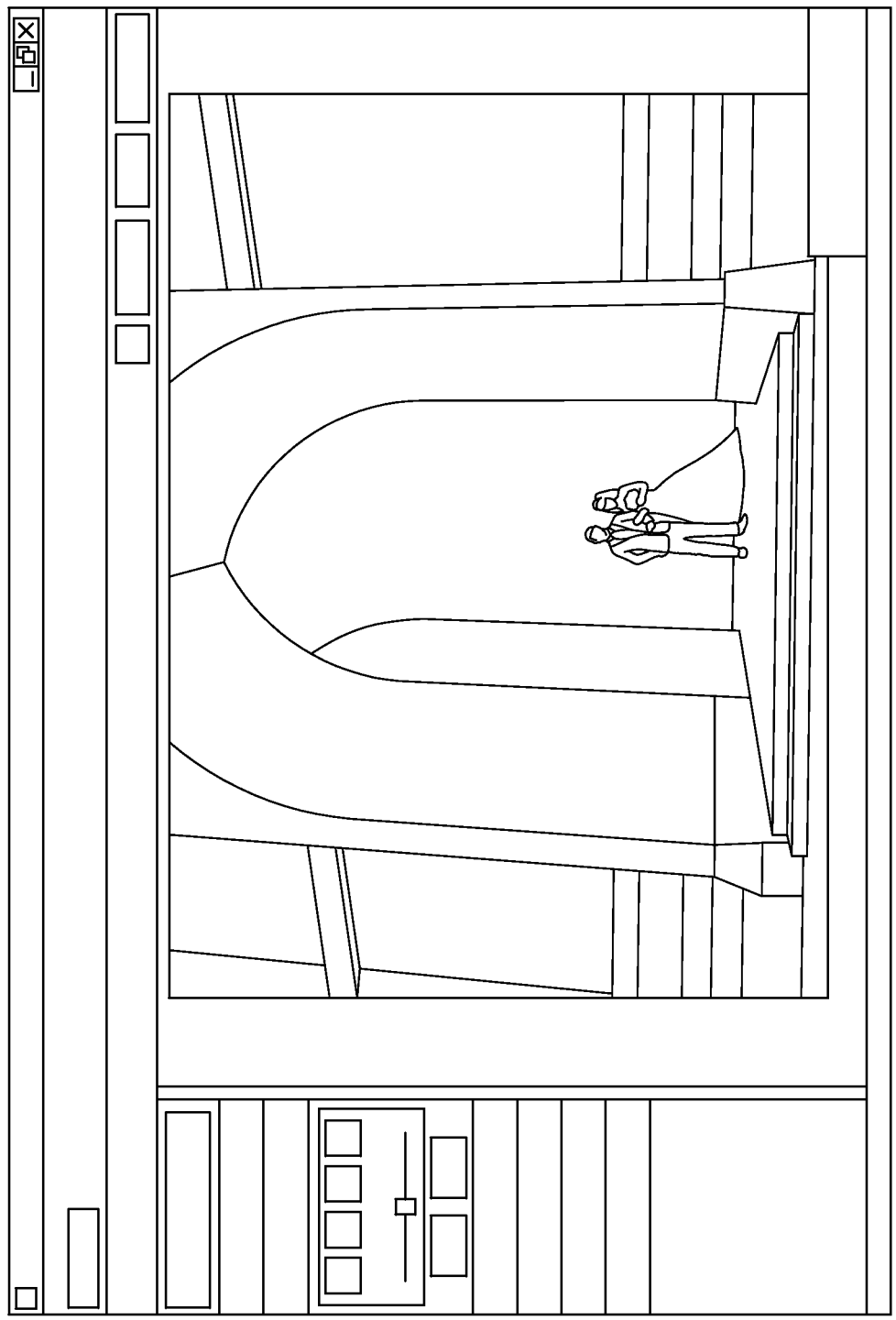
FIGS. 1, 2, and 3, depict an original image displayed in a picture frame, a left-rotated portion of the original image displayed in the picture frame, and a right-rotated portion of the original image displayed in the picture frame.
Figure 2:
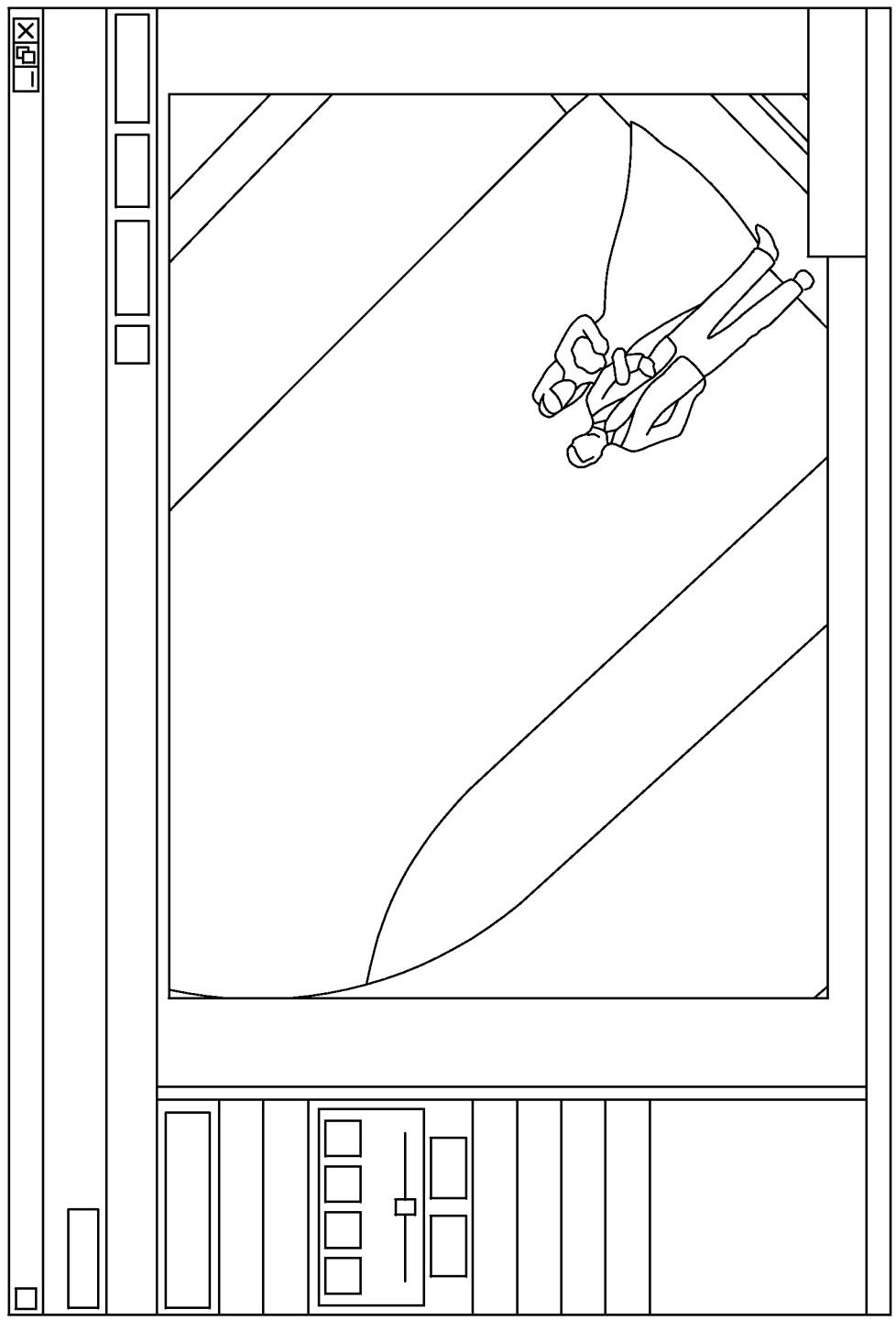
Figure 3:
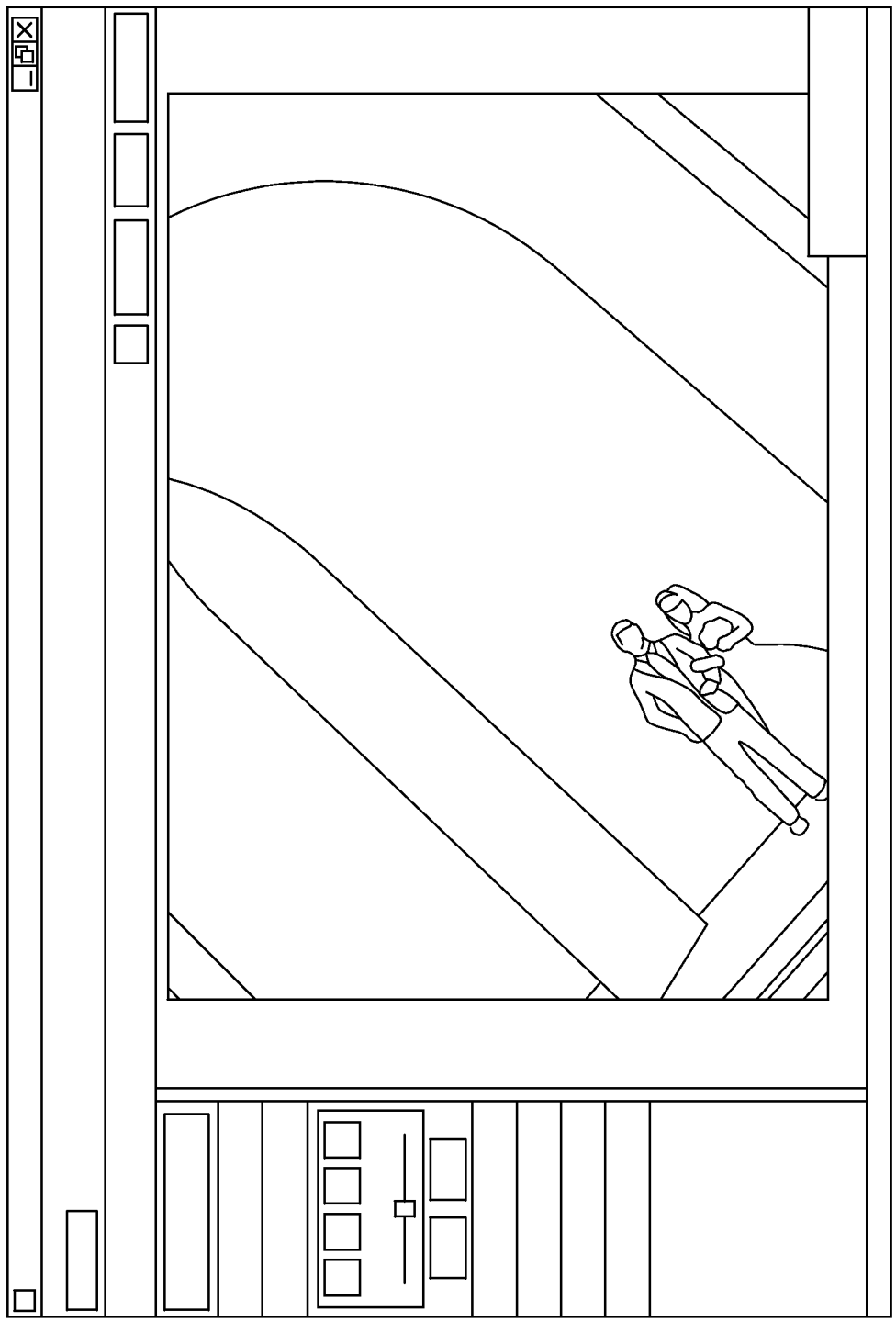
Figure 4:
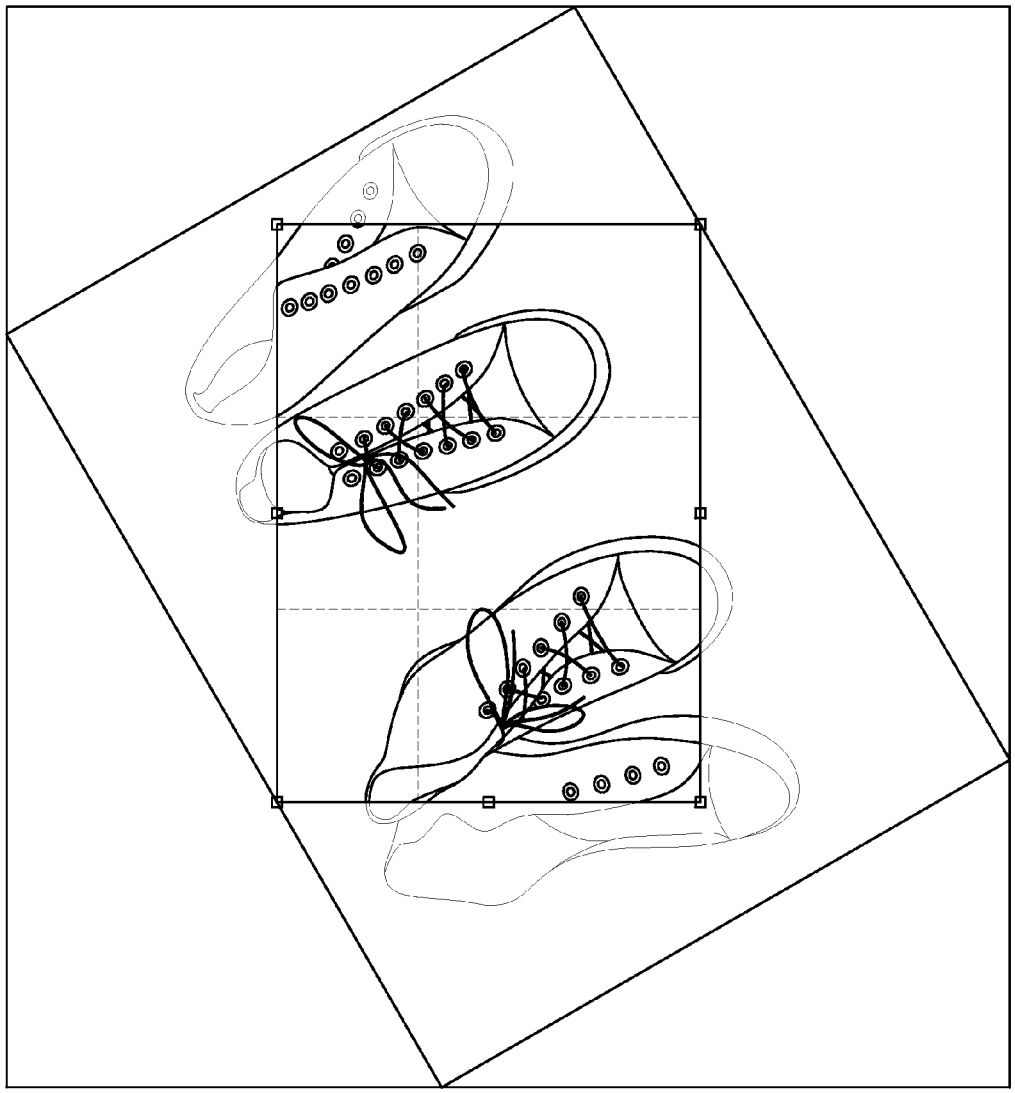
FIG. 4 depicts an example of a displayed image with white or gray space added to fill the picture frame.
Figure 5:
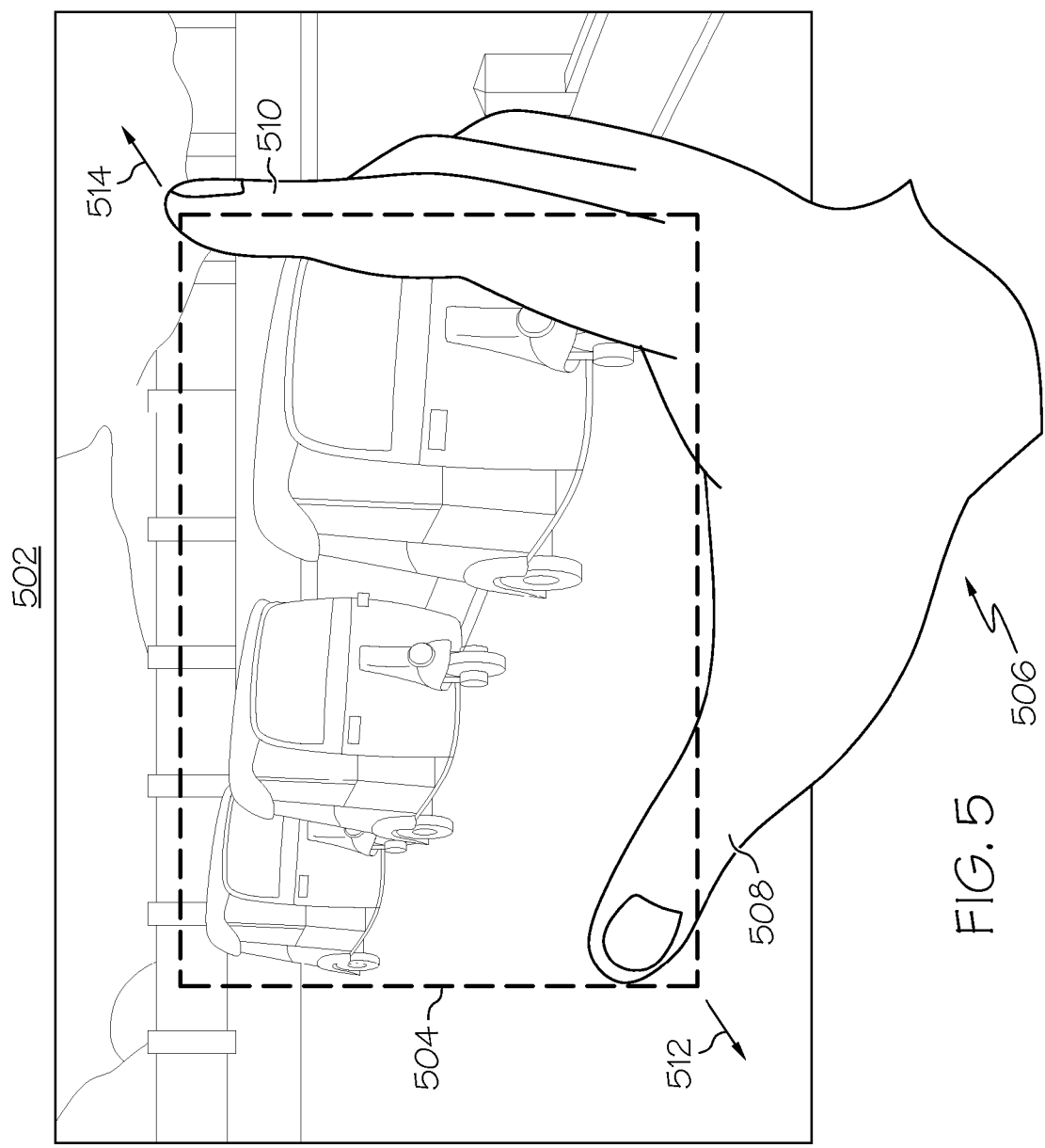
FIG. 5 illustrates an image portion selection operation using a selection rectangle over a portion of a displayed image, according to one example.

FIG. 5 illustrates a selection operation selecting a portion of a displayed image using a selection rectangle frame over the portion of the displayed image, according to one example. An image 502 is displayed in a display frame, such as in a display screen or in a window frame within a larger display screen. The user can select a portion of the displayed image 502, such as by using hand gesture/swipe motion on a touch screen over the display screen and/or by using another user input device. Examples of user input devices include keyboard, keypad, arrow keys, trackballs, trackpads, and finger movement navigation modules. Optical Navigation Modules (ONMs) generally sense a gesture performed upon the module by a user's finger. These gestures/swipes are interpreted by the electronic device in order to carry out a perceived intention of the user.

As illustrated in the example of FIG. 5, the user can create a selection rectangle frame 504 over the displayed image 502 by gesturing with their hand 506 moving two fingers 508, 510, apart 512, 514, on a touch screen over the displayed image 502 on a display screen (or on another user input device). The selection rectangle frame 504 selects the portion of the displayed image 502 inside the selection rectangle frame 504, as shown. This is a natural and intuitive motion by a user.

Figure 6:
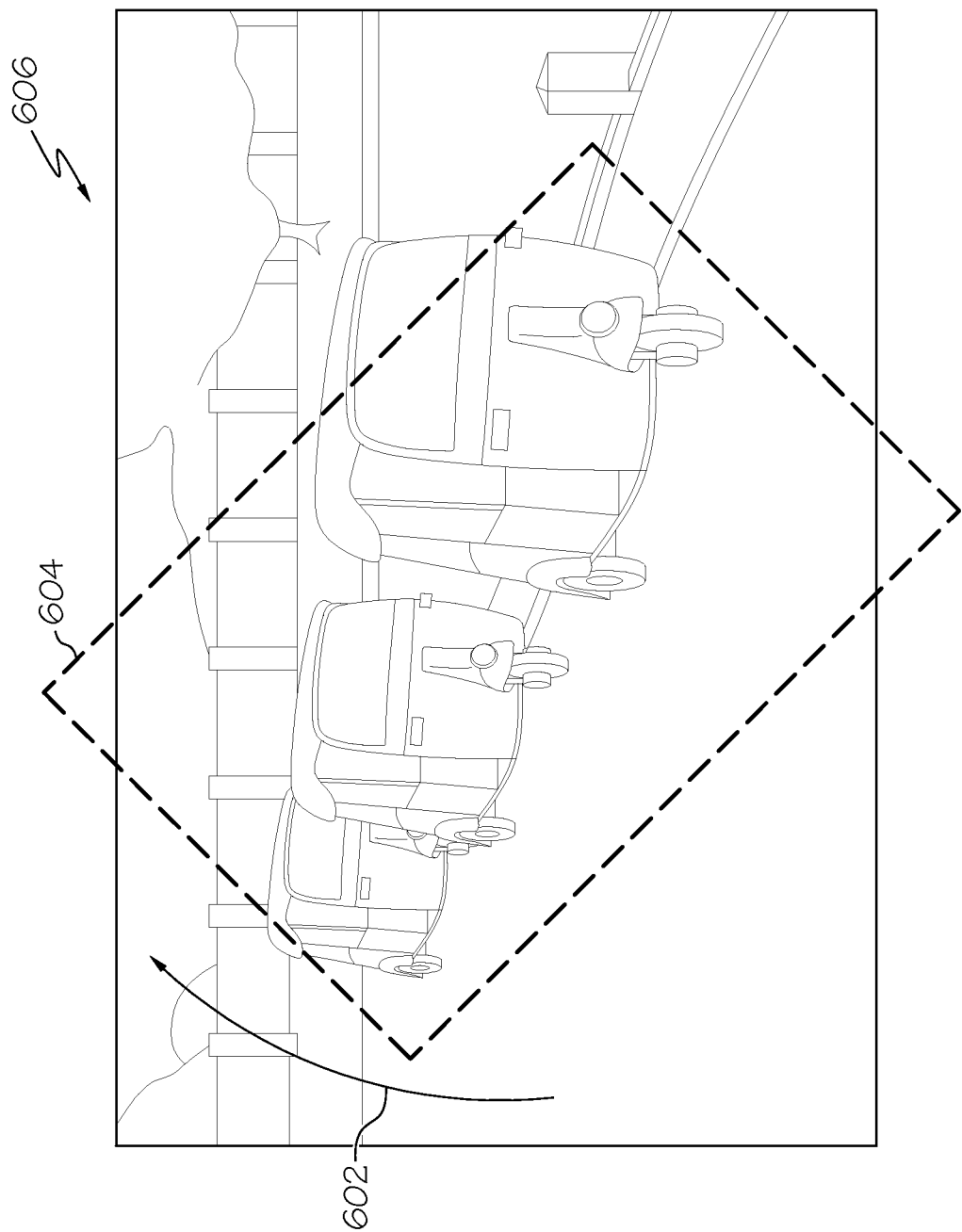
FIG. 6 illustrates the selection rectangle of FIG. 5 being rotated 45 degrees, according to one example.

Next, the user can optionally rotate the selection rectangle frame. FIG. 6 shows an example of what would happen if the original size selection rectangle frame 504 would be rotated 602 forty-five degrees from the position of the selection frame 504 shown in FIG. 5 to the new position of the selection frame 604 shown in FIG. 6. As can be seen in FIG. 6, the selection frame 604 extends outside of the original displayed image frame 606. That could result in undesirable white/gray space being added to the rotated image selection inside the selection frame 604.

Figure 7:
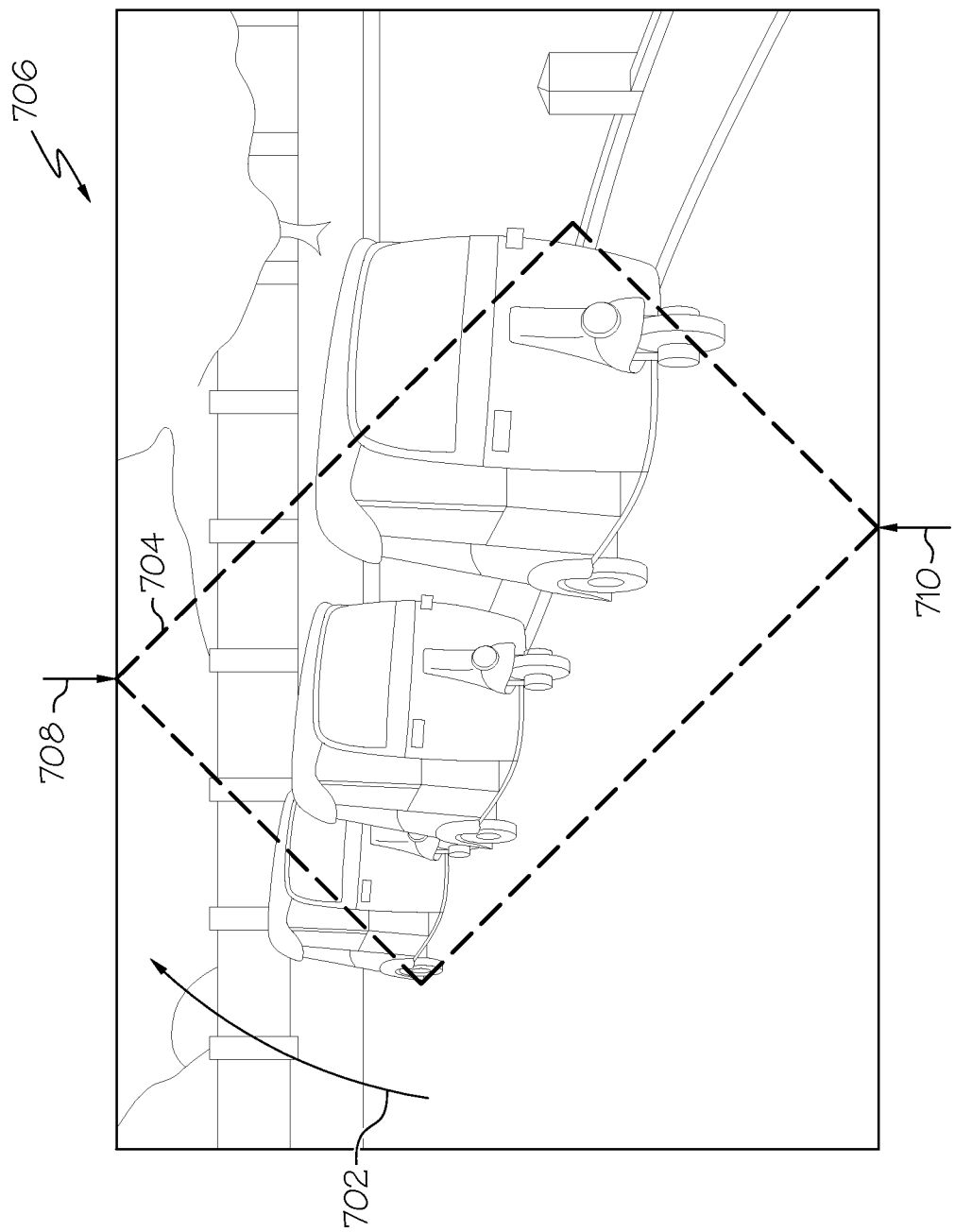
FIG. 7 illustrates a selection rectangle similar to that of FIG. 5 and rotated 45 degrees while being maintained within the displayed image boundaries on a display screen, according to one example.

However, as shown in FIG. 7, the similar forty-five degrees rotation 702 of the selection rectangle frame 504 from the position of the selection rectangle frame 504 shown in FIG. 5 to the new position of the selection rectangle frame 704 shown in FIG. 7 results in a modified size selection rectangle frame 704. That is, according to certain embodiments, the size of the selection frame 504 is dynamically changed 708, 710, to that shown with selection frame 704 while rotating 702 the selection frame 704 maintaining it within the boundaries of the original displayed image 706 in the display frame on the display.

Figure 8:
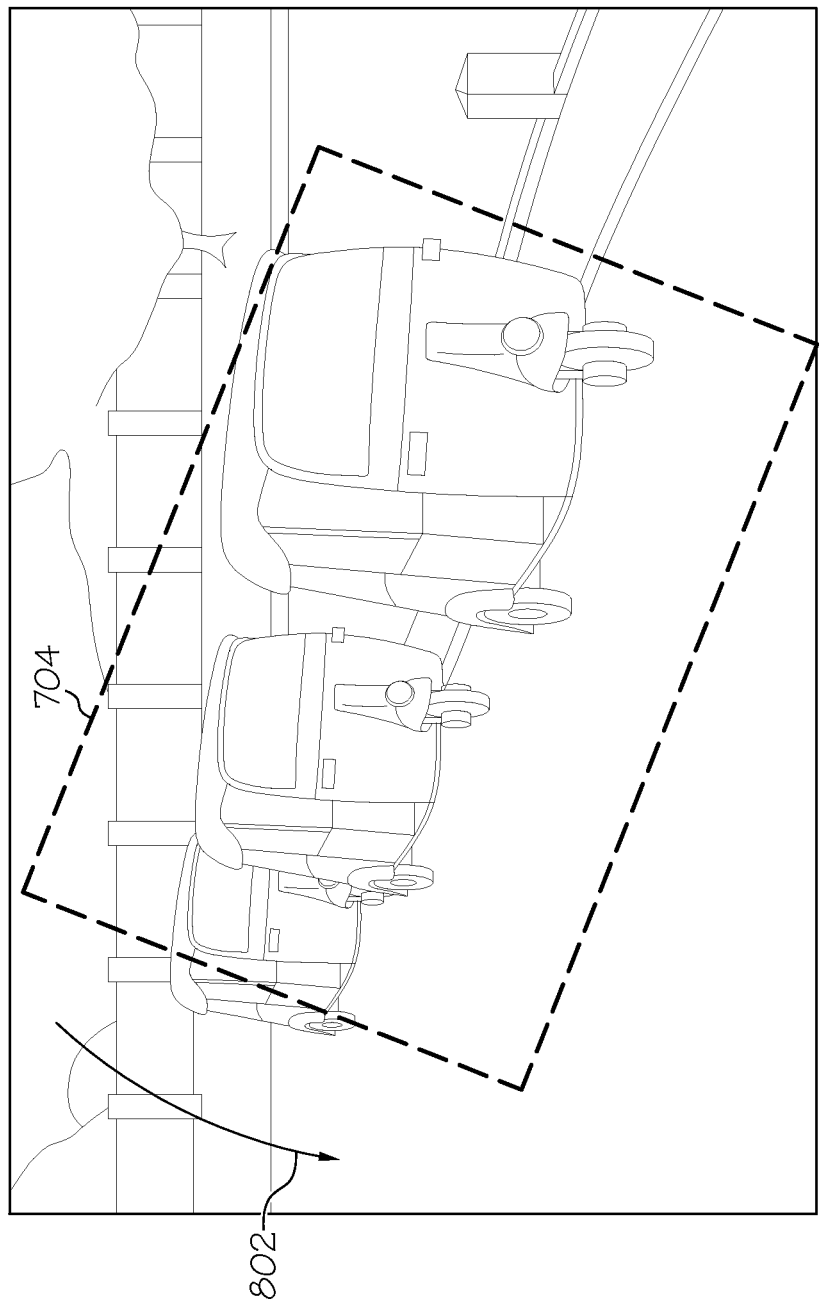
FIGS. 8, 9, 10 illustrate the 212 selection rectangle of FIG. 7 being rotated in gradual steps back from 45 degrees to zero degrees while being maintained within the displayed image boundaries on a display screen and contemporaneously being expanded up to the original size of the original selection rectangle as shown in FIG. 5, according to one example.
Figure 9:
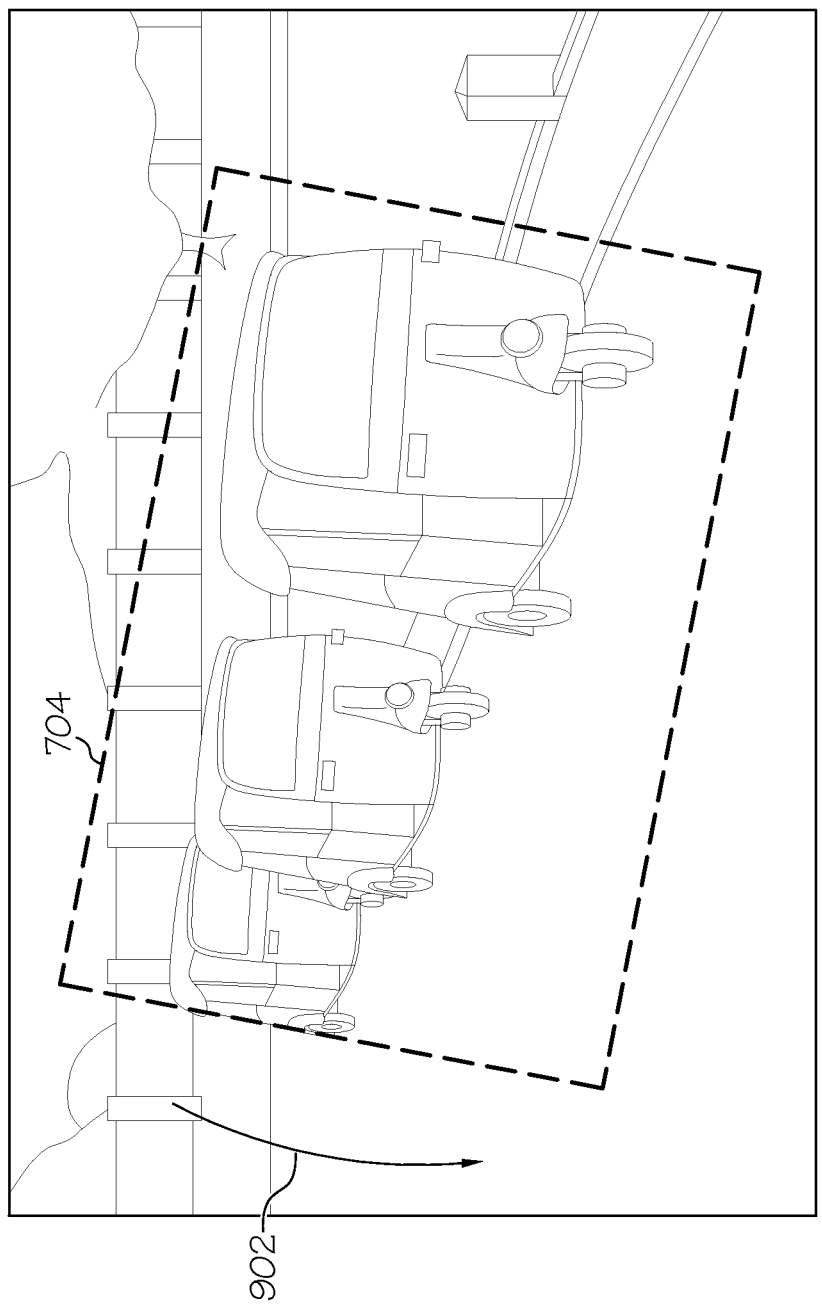
Figure 10:
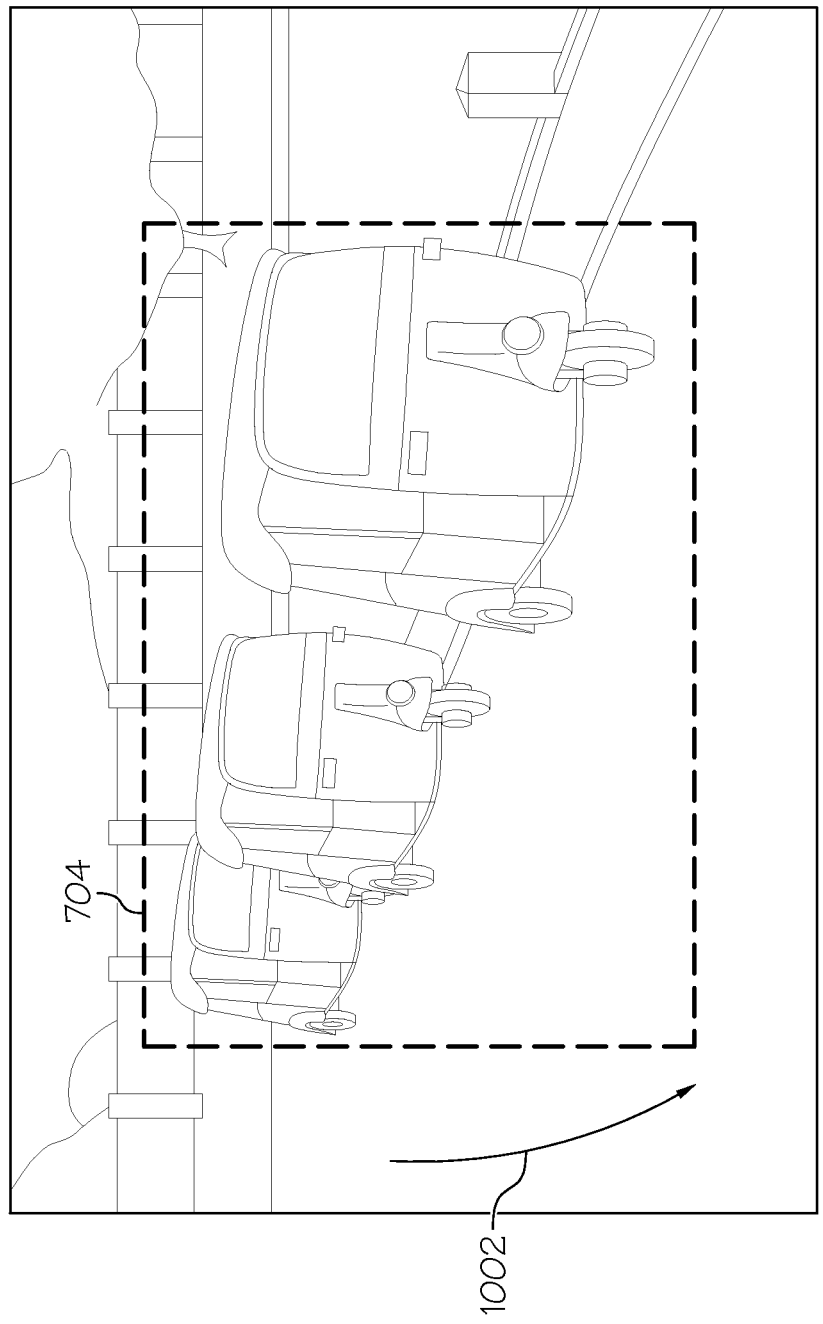

According to various embodiments of the present disclosure, the selection frame 704, while being rotated over the displayed image 706, either reduces 708, 710, in size to maintain the selection frame 704 within the boundaries of the displayed image 706 (e.g., within the display frame) or expands in size up to the original size of the selection rectangle frame 504. FIGS. 8, 9, and 10, illustrate rotation steps 802, 902, 1002, in rotation of the selection rectangle frame 704 from the forty-five degrees rotated position shown in FIG. 7 to the zero degrees rotated position shown in FIG. 10. It should be noted that while FIGS. 8, 9, and 10, illustrate rotation steps 802, 902, 1002, of the selection rectangle frame 704, they also show that the selection rectangle frame 704 also expands in size up to the original size of the selection frame 504 shown in FIG. 5. That is, during rotation, according to various embodiments, the variable size selection rectangle frame 704 is maintained within the outer boundaries of the displayed image in the display frame and contemporaneously is maintained expanded as much as possible up to the original size of the selection frame 504 as shown in FIG. 5.

According to one embodiment, rotation 702 of a selection frame such as to the position of the rotated selection frame 704 is caused by the user gesturing rotational movement of two fingers over and inside the selection rectangle frame 504, such as shown in FIG. 5. Alternatively, once the user gestures to create the selection rectangle frame 504, such as shown in FIG. 5, the user then can move two fingers away from the touch screen (or other user input device) and then gesture rotational movement of one finger at the touch screen (or at another user input device) over, outside the selection frame 704, and proximate thereto, to move and rotate 702 the selection frame 704 such as to the position shown in FIG. 7. This alternative rotation mechanism with one finger is useful since if only permitting rotation control by using the two fingers inside the selection rectangle frame 504 would possibly result in the user's hand obscuring part of the displayed image and thereby affect the placement of the frame. According to one embodiment, the single finger rotation causes the selection frame 704 to pivot and rotate around the selection frame's center axis. According to one alternative embodiment, the rotation pivot point could be altered to an axis of rotation that is different than the selection frame's center axis. This selection or configuration of an axis of rotation can be set by configuration of parameters in the portable electronic device. These configuration parameters can be configured, for example, in non-volatile memory 806 in the portable electronic device 800 (see FIG. 8) by downloading configuration features and functions into the portable electronic device 800, such as at the factory, from service personnel, or optionally by over-the-air programming. Optionally, these configuration parameters could be set by user configuration while using the user interface 836, 834, on the portable electronic device 800. While the examples of user gesturing discussed above include rotational movement of the of two fingers over and inside the selection rectangle frame 504 or alternatively rotational movement of one finger over, outside the selection frame 704, and in proximity thereto, alternative forms of user gestures for causing rotational movement of the selection frame 704 are anticipated by the present disclosure. For example, two fingers could be moved closer together or farther apart over and inside the selection rectangle frame 504 to cause the rotational movement of the selection frame 704. Movement closer together would cause rotation of the selection rectangle frame 504 in a first rotation while movement farther apart would cause rotation of the selection rectangle frame 504 in a second different rotation. As another example, linear movement of one finger over, outside the selection frame 704, and in proximity thereto, could cause the rotational movement of the selection frame 704. According to one embodiment, linear movement of the finger in a first direction would cause rotation of the selection rectangle frame 504 in a first rotation while linear movement of the finger in a second different direction (optionally in a second direction opposite the first direction) would cause rotation of the selection rectangle frame 504 in a second different rotation.

According to one embodiment, a single finger swipe or drag inside the selection frame 704 causes the selection frame 704 to be dragged or repositioned on the displayed image in the display screen. This relocation of the selection frame 704 can be useful to adjust the size of the selection frame 704 to an expanded size up to the original size of the selection frame 504 while maintaining it within the boundaries of the displayed image in the display frame.

Separate controls are provided in the portable electronic device to rotate the picture 90 degrees (i.e. to switch between portrait and landscape arrangements of the image itself, and not just the selection frame). The size of the selection frame 704 is adjusted accordingly.

The size of the selection frame 704 will continue to change as the selection frame 704 is rotated, dragged, or repositioned, on the displayed image in the display frame, until the selection frame 704 is released by the user. The user can release the selection frame 704 from a current operation such as by using a tapping hand gesture on a touch screen display (or by using or actuating another user input device). In summary, the size of the selection frame 704 can increase as well as decrease as the selection frame 704 is rotated, dragged, or repositioned. If the selection frame 704 was rotated several times the size of the frame would change accordingly, by tracking and being bound by the edges of the displayed image 706 in the display frame.

In one implementation, it is assumed that on release the user is indicating some acceptance of the size/rotation/crop of the current selection frame 704 (having a "current size"). As such, according to various embodiments, the current displayed image 706 filling the display frame is then set to the current selection frame 704, although this is not always necessarily the case for other embodiments. On further rotation the selection frame 704 can be made smaller than the current size of the displayed image in the display frame but not larger. Every time the user does a release, that selection frame size becomes the current size of the selection frame 704. Further calculations for resizing the selection frame 704 are based on that new current size of the selection frame 704.

After rotation of the selection frame 704, selection of any fixed aspect ratios—e.g., square, 4:3, super wide, and the like, will have the effect of cancelling out a rotation operation previously selected for the selection frame 704.

Figure 13:
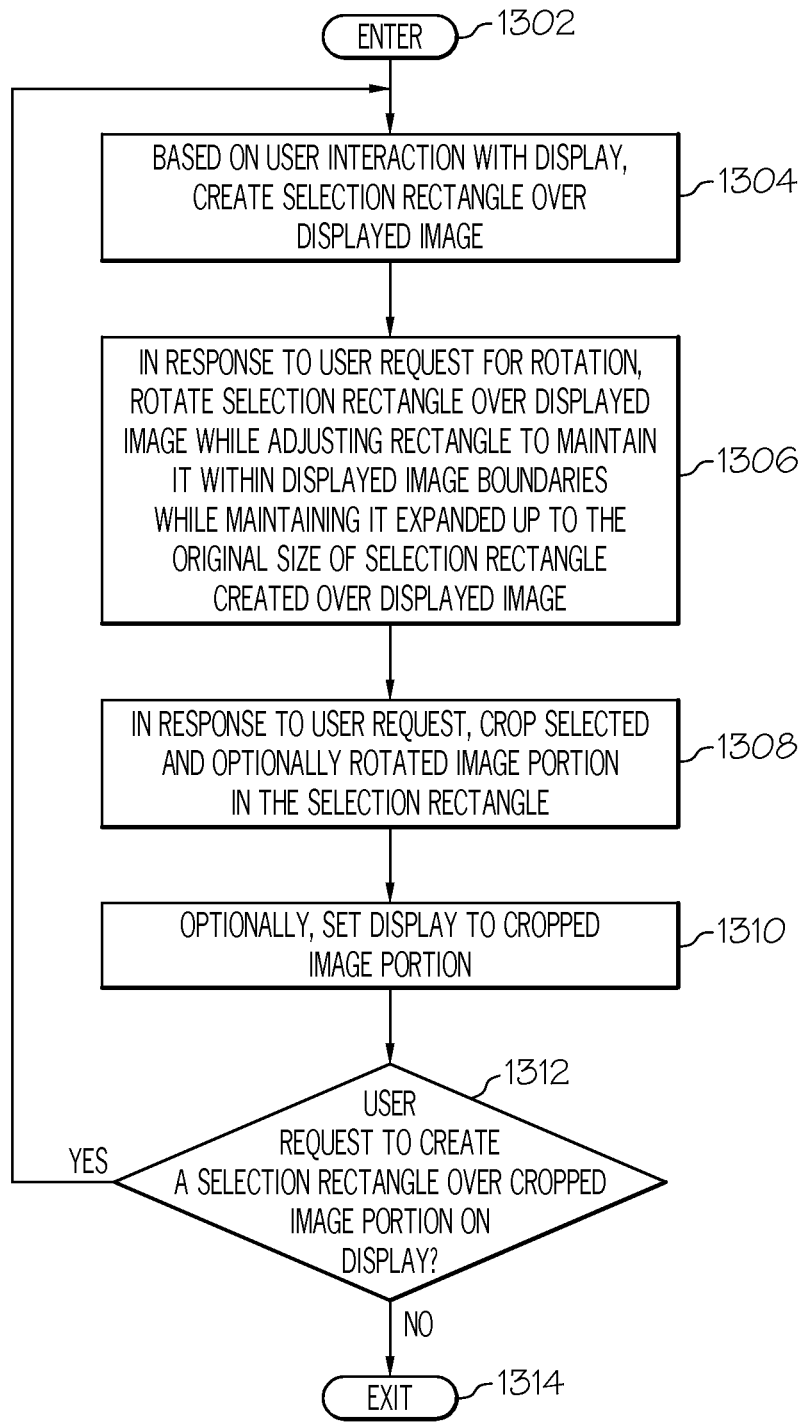
FIG. 13 is a flow diagram illustrating one example of an operational sequence according to various embodiments of the present invention.

FIG. 13 illustrates one example of an operational sequence according to various embodiments of the present invention. After entering the operational sequence, at step 1302, the portable electronic device determines, based on user interaction with the display (such as a touch screen or using another user input device), a display controller 802 creates a selection rectangle over a current displayed image, at step 1304.

Based on determining a user request for rotation, at step 1306, the display controller 802 rotates a selection rectangle frame 704 over the displayed image while adjusting the selection rectangle frame 704 size to maintain it within the outer boundaries of the displayed image in the display frame and also while maintaining the selection frame 704 expanded as much as possible up to the original size of the selection rectangle frame 504 created over the displayed image 502.

Based on a user request, at step 1308, the display controller 802 crops the selected portion of the displayed image, which optionally may be a rotated selection rectangle frame 704 on the displayed image 706. Then, optionally the display controller 802 sets the current displayed image filling the display frame to the cropped portion of the previous displayed image. If the user requests, at step 1312, to create a selection rectangle frame 704 over the current displayed image (i.e., which is the cropped portion of the previous displayed image), then the operational process is repeated, at steps 1304, 1306, 1308, 1310, and 1312. It is noted here that this process can be repeated recursively allowing a user flexibility in performing combinations of image crop with optional image rotate operations with very natural and intuitive manual gestures such as on a display screen. Otherwise, at step 1312, the process is exited, at step 1314.

Handheld Communication Device

Figure 11:
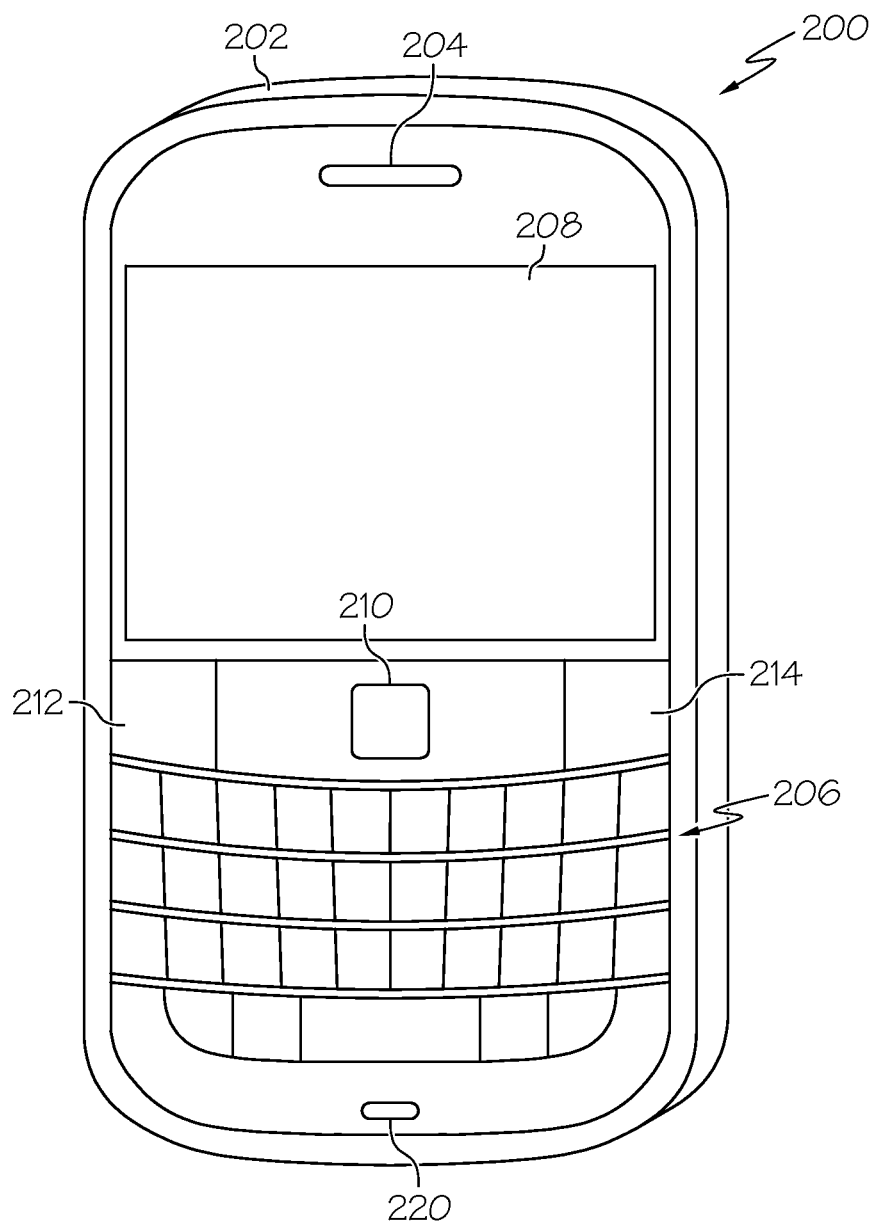
FIG. 11 depicts a user interface of a portable electronic device, in accordance with one example.

FIG. 11 illustrates an example of a portable electronic device 200 that comprises a handheld communications device 202 suitable for use with various embodiments of the present disclosure. The portable electronic device 200 of the present example comprises at least one of a Personal Digital Assistant (PDA), a smart-phone, a cellular telephone, a mobile phone, a tablet computer, a laptop PC, or any other type of portable electronic device. In general, a handheld communication device 202 refers to any communication device that is sized, shaped and designed to be held or carried in a human hand. The portable electronic device 200 includes a wireless communications subsystem, described below, that is able to exchange voice and data signals. In one example, the wireless communications subsystem is able to receive a wireless signal conveying image information (e.g., various types of content) to be displayed by the portable electronic device.

The portable electronic device 200 includes an earpiece speaker 204 that is used to generate output audio to a user engaged in, for example, a telephone call. A microphone 220 is able to accept audible signals, such as a user's voice, and produce an electrical signal representing the audible signal. The portable electronic device 200 further includes a keyboard 206 that allows a user to enter alpha numeric data for use by, for example, application programs executing on the portable electronic device.

The portable electronic device 200 has a display 208. The display 208 depicted in FIG. 11 is a graphical alpha-numeric display capable of displaying various images to a user. The display 208 in one example comprises a touchscreen user input interface device coupled with the display 208 (i.e., providing a touchscreen display) that allows a user to touch the screen of the display 208 to select items and to perform gestures, such as swiping a finger across the screen of the display 208, to provide a user input interface to an application program operating on the portable electronic device 200. Based on detecting a user's gesture, such as swiping, or moving, a finger touching the screen of the display 208 across the screen, the display 208 accepts a user interface input that is associated with the gesture performed by the user.

The portable electronic device 200 further has a first selection button 212 and a second selection button 214. In one example, a user is able to select various functions or select various options presented on the display 208 by pressing either the first selection button 212 or the second selection button 214. In another example, the first selection button 212 and the second selection button 214 are associated with particular functions that are performed in response to pressing the respective button. The portable electronic device 200, according to the present example, also includes a trackpad 210 that typically, although not necessarily, is a user input device located separate from the display and/or from any user input device integrated with the display 208 (e.g., a touchscreen display). The trackpad 210 is able to accept user input (e.g., user gestures) indicating a direction or movement, a magnitude of movement, a velocity of movement, or a combination of these quantities, in response to a user moving at least one finger (or stylus) across the face of the trackpad 210.

In further examples, a user is able to use various techniques to provide inputs that are accepted by a processor of the portable electronic device 200. For example, the microphone 220, is communicatively coupled with a processor 802 (see FIG. 12), and thereby is able to accept audible voice commands uttered by a user and process those audible voice commands to create input signals that are accepted by other processes to control further processing. A user is also able to use the keyboard 206 to enter commands that a processor 802 of the portable electronic device 200 interprets to produce inputs that are accepted by other processes to control further processing.

Figure 12:
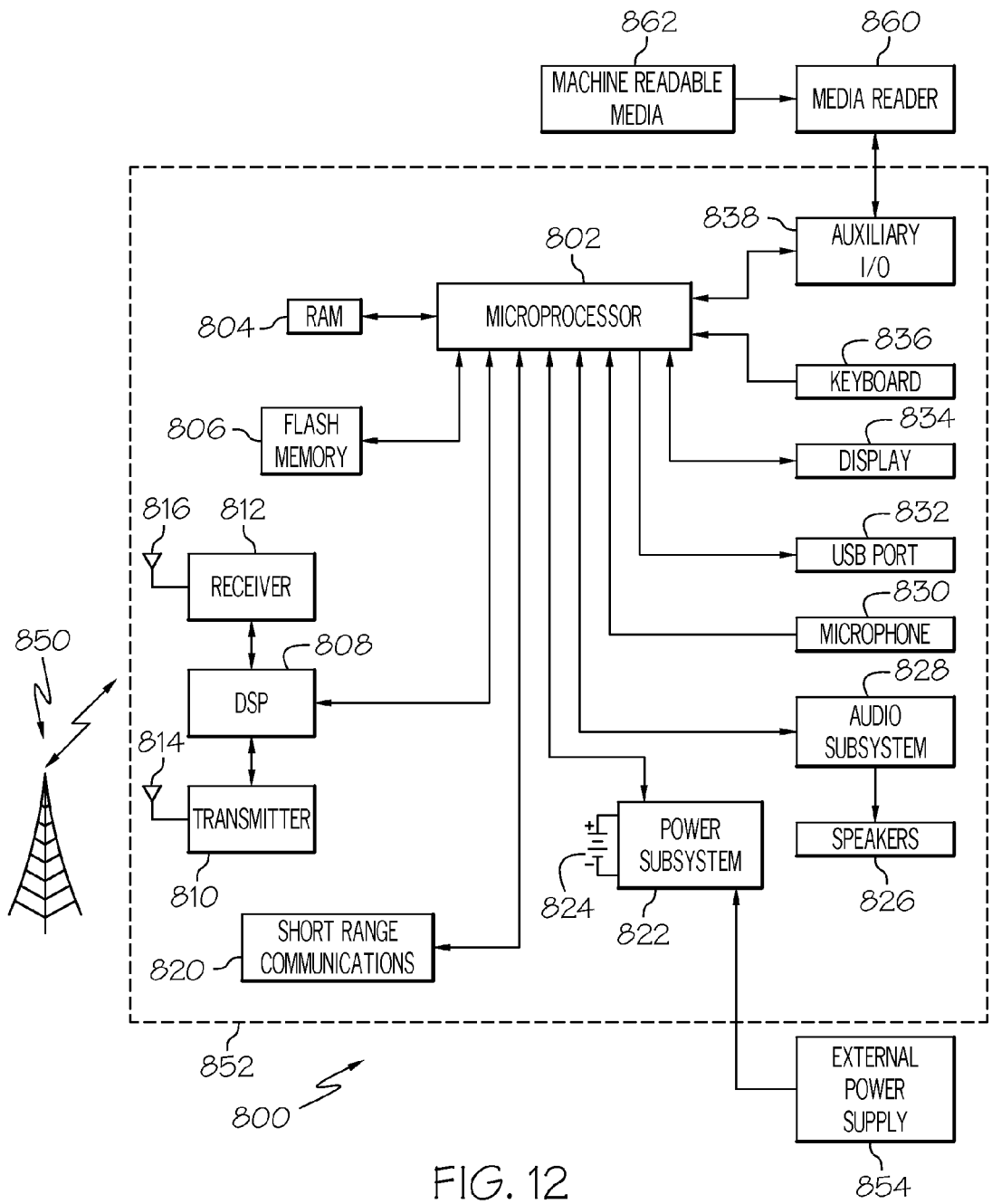
FIG. 12 is a block diagram of the portable electronic device of FIG. 11, and associated components in which the systems and methods disclosed herein may be implemented.

FIG. 12 is a block diagram of a portable electronic device 800 and associated components 852 in which the systems and methods disclosed herein may be implemented. In this example, a portable electronic device 800 comprises a wireless two-way communication device that is able to provide one or both of voice and data communication capabilities. Such portable electronic devices communicate with a wireless voice or data network 850 via any suitable wireless communication protocol or protocols. Wireless voice communication is performed using either analog or digital wireless communication protocols according to the network 850 to which the wireless communication device is connected. Data communication to and from the portable electronic device 800 support exchanging data with other computer systems through any suitable network, such as the Internet. Examples of electronic devices that are able to incorporate the above described systems and methods include data pagers, data messaging devices, cellular telephones, or a data communication device that may or may not include telephony capabilities.

The illustrated portable electronic device 800 is an example electronic wireless communication device that includes two-way wireless communication components to provide wireless data communication with a wireless data network, a wireless voice network, or both. Such electronic devices incorporate communication subsystem elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication subsystem is dependent upon the communication network and associated wireless communication protocols with which the device is intended to operate.

Data communication with the portable electronic device 800 generally includes receiving data, such as a text message or web page download, through the receiver 812 and providing that received data to the microprocessor 802. The microprocessor 802 is then able to further process the received data for output to the display 834 or to other devices such as an auxiliary I/O device 838 or through the Universal Serial Bus (USB) port 832. The portable electronic device 800 also allows a user to create data items and content, such as e-mail messages and graphical images, using a user input device such as the keyboard 836 (or other user input device as has been discussed above) and possibly in conjunction with use of the display 834, and possibly with data received through an auxiliary I/O interface device 838. Such composed items are then able to be transmitted over a communication network through the transmitter 810.

The portable electronic device 800 performs voice communications by providing received signals from the receiver 812 to the audio subsystem 828 for reproduction by speakers 826. A user's voice is able to be converted to electrical signals from microphone 830 for transmission by transmitter 810.

A short-range communication subsystem 820 provides communication between the portable electronic device 800 and different systems or devices. Examples of short-range communication subsystems 820 include an infrared device and associated circuits and components, or a Radio Frequency based communication subsystem such as a Bluetooth®, Zigbee®, Wi-Fi or Wi-MAX communication subsystem to provide for communication with similarly-enabled systems and devices.

The portable electronic device 800 includes at least one microprocessor (at least one processor) 802 that controls device operations for the device 800. The microprocessor 802 is communicatively coupled with and interacts with the above described communication subsystem elements to implement and control wireless communication with the network 850. The microprocessor 802 is further communicatively coupled with, and performs control and data exchange functions by interacting with, for example, non-volatile memory such as flash memory 806, and random access memory (RAM) 804, auxiliary input/output (I/O) device 838, USB Port 832, a display 834, a keyboard 836, an audio subsystem 828, a microphone 830, a short-range communication subsystem 820, a power subsystem 822, and any other device subsystems. In one example, the display 834 comprises a touchscreen display that is able to accept inputs from a user that correspond to various gestures performed by the user in touching the screen of the display 834.

In one example, the microprocessor 802 comprises a display controller 802 that generates, creates, modifies, controls and manages images and other data presented on the display 834. The microprocessor (e.g., display controller) 802 further is communicatively coupled with and accepts user inputs from a user input interface device, such as from a keyboard 836, buttons 212, 214, a touchscreen display 208, 834, a trackpad 210, or other types of user input devices that are not shown in this example.

An internal power pack, such as a battery 824, is connected to a power subsystem 822 to provide power to the circuits of the portable electronic device 800. The power subsystem 822 includes power distribution circuitry to supply electric power to the various components 852 of the portable electronic device 800 and also includes battery charging circuitry to support recharging the battery 824. An external power supply 854 is able to be connected to the power subsystem 822. The power subsystem 822 includes a battery monitoring circuit that provides a status of one or more battery conditions, such as remaining capacity, temperature, voltage, current draw, and the like. The microprocessor 802 is communicatively coupled with the power subsystem 822, and thereby receives signals indicating the status of the one or more battery conditions. The microprocessor 802 can notify any of these conditions to the user of the device 800, such as by generating visible indicators on the display 834 and/or generating audible indicators via the audio subsystem 828 and the speakers 826.

The microprocessor 802 is communicatively coupled with the USB port 832 and thereby provides data communication between the portable electronic device 800 and one or more external devices. Data communication through USB port 832 enables various user data, such as data files or configuration parameters for the portable electronic device 800 to be exchanged between the device 800 and an external device. The USB port 832 is also able to be used to convey external power to the power subsystem 822 from a suitable external power supply.

Operating system software and configuration parameters used by the microprocessor 802 are stored in the flash memory 806 which is communicatively coupled with the microprocessor 802. In addition to, or in place of, flash memory 806, a battery backed-up RAM or other non-volatile storage data elements are able to store operating systems, other executable programs, configuration parameters, or any combination thereof. As an example, a computer executable program configured to perform the display transition process 700, as is described above, can be included in a software module stored in flash memory 806.

RAM memory 804 is communicatively coupled with the microprocessor 802, and is used to store data produced or used by the microprocessor 802. RAM memory 804 is further able to temporarily store program data from flash memory 806 or from other storage locations. RAM memory 804 is also used to store data received via wireless communication signals or through wired communication.

The microprocessor 802 in some examples executes operating system software as well as various other software applications such as user applications, small, special purpose applications referred to as "apps," and the like. Some software, such as operating system and other basic user functions such as address books are able to be provided as part of the manufacturing process for the electronic device.

In addition to loading applications as part of a manufacturing process, further applications and/or configuration parameters are able to be loaded onto the portable electronic device 800 through, for example, the wireless network 850, an auxiliary I/O device 838, USB port 832, short-range communication subsystem 820, or any combination of these interfaces. Once these applications are loaded into the portable electronic device 800, these applications are executed by the microprocessor 802.

A media reader 860 is able to be connected to an auxiliary I/O device 838 to allow, for example, loading computer readable program code of a computer program product into the portable electronic device 800 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. The media reader 860 is alternatively able to be connected to the electronic device through the USB port 832 or computer readable program code is alternatively able to be provided to the portable electronic device 800 through the wireless network 850.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of presenting image information on a display, comprising:
   displaying an image in a display frame on the display;
   receiving a selection of a portion of the displayed image in a selection rectangle frame over the displayed image, based on detecting a first gesture;
   determining a request for rotation of the selection rectangle frame based on detecting a second gesture; and
   based on the determined request for rotation, rotating the selection rectangle frame on the displayed image and resizing the selection rectangle frame while maintaining the selection rectangle frame within boundaries of the displayed image in the display frame.

2. The method of claim 1, where the rotating the selection rectangle frame on the displayed image further comprising:
   while maintaining the selection rectangle frame within boundaries of the displayed image in the display frame, contemporaneously expanding the selection rectangle frame up to an original size of the selection rectangle frame displayed over the displayed image.

3. The method of claim 1, further comprising:
determining a request for crop of the portion of the displayed image in the displayed selection rectangle frame; and
based on determining the request for crop, cropping the portion of the displayed image in the displayed selection rectangle frame.

4. The method of claim 1, further comprising:
determining a request for setting a current displayed image filling the display frame on the display to the portion of the displayed image in the displayed selection rectangle frame;
based on determining the request for setting the current displayed image filling the display frame, setting the current displayed image filling the display frame on the display to the portion of the displayed image in the displayed selection rectangle frame;
based on detection of a third gesture in connection with the current displayed image, receiving a selection of a portion of the current displayed image in a selection rectangle frame over the current displayed image;
determining a second request for rotation of the displayed selection rectangle frame over the current displayed image based on detecting a fourth gesture; and
based on the determined second request for rotation, rotating the selection rectangle frame over the current displayed image and resizing the selection rectangle frame while maintaining the selection rectangle frame within boundaries of the current displayed image in the display frame.

5. The method of claim 1, wherein detecting the first gesture comprises detecting movement of two fingers apart over the displayed image in the display frame on the display.

6. The method of claim 1, wherein detecting the second gesture comprises at least one of:
detecting rotational movement of two fingers over and inside the selection rectangle frame on the displayed image; and
detecting rotational movement of one finger over, outside and in proximity to the selection rectangle frame on the displayed image.

7. The method of claim 1, wherein detecting the second gesture comprises at least one of:
detecting movement of two fingers, either closer together or farther apart, over and inside the selection rectangle frame on the displayed image; and
detecting linear movement of one finger over, outside and in proximity to the selection rectangle frame on the displayed image.

8. The method of claim 1, further comprising:
based on determining a request for dragging the selection rectangle frame, moving the selection rectangle frame over the displayed image in the display frame following a determined movement of a finger swipe or drag in the selection rectangle frame, and resizing the selection rectangle frame while maintaining the selection rectangle frame within boundaries of the display frame.

9. The method of claim 1, wherein the method is performed with a portable electronic device including a touchscreen display, the displayed image being displayed in a display frame on the touchscreen display, and the first gesture and the second gesture being detected with the touchscreen display.

10. The method of claim 9, wherein the portable electronic device comprises at least one of: a smart-phone, a cellular phone, a mobile phone, a tablet computer, a personal digital assistant, and a laptop PC.

11. The method of claim 1, wherein the first gesture and the second gesture are detected through using a trackpad, and the image is displayed in the display frame on the display located separate from the trackpad.

12. A computer program product for controlling presentation of image information on a display, the computer program product comprising:
a computer readable storage medium having computer readable program code embodied therewith, the computer readable program code comprising instructions for performing a method comprising:
displaying, with at least one processor, an image in a display frame on the display;
receiving a selection of a portion of the displayed image in a selection rectangle frame over the displayed image, based on detecting a first gesture;
determining a request for rotation of the selection rectangle frame, based on detecting a second gesture; and
based on the determined request for rotation, rotating the selection rectangle frame on the displayed image and resizing the selection rectangle frame while maintaining the selection rectangle frame within boundaries of the displayed image in the display frame.

13. The computer program product of claim 12, where the rotating the selection rectangle frame on the displayed image further comprising:
while maintaining the selection rectangle frame within boundaries of the displayed image in the display frame, contemporaneously expanding the selection rectangle frame up to an original size of the selection rectangle frame displayed over the displayed image.

14. The computer program product of claim 12, the method further comprising:
determining a request for crop of the portion of the displayed image in the displayed selection rectangle frame; and
based on determining the request for crop, cropping the portion of the displayed image in the displayed selection rectangle frame.

15. The computer program product of claim 12, the method further comprising:
determining a request for setting a current displayed image filling the display frame on the display to the portion of the displayed image in the displayed selection rectangle frame;
based on determining the request for setting the current displayed image filling the display frame, setting the current displayed image filling the display frame on the display to the portion of the displayed image in the displayed selection rectangle frame;
based on detection of a third gesture in connection with the current displayed image, receiving a selection of a portion of the current displayed image in a selection rectangle frame over the current displayed image;
determining a second request for rotation of the displayed selection rectangle frame over the current displayed image based on detecting a fourth gesture comprising at least one of:
movement of two fingers over and inside the selection rectangle frame on the current displayed image, and
movement of one finger over, outside, and in proximity to the selection rectangle frame on the current displayed image; and based on the determined second request for rotation, rotating the selection rectangle frame on the current displayed image and resizing the selection rectangle frame while maintaining the selection rectangle frame within the boundaries of the current displayed image in the display frame.

16. The computer program product of claim 12, wherein detecting the second gesture comprises at least one of:
   detecting rotational movement of two fingers over and inside the selection rectangle frame on the displayed image; and
   detecting rotational movement of one finger over, outside and in proximity to the selection rectangle frame on the displayed image.

17. The computer program product of claim 12, wherein detecting the second gesture comprises at least one of:
   detecting movement of two fingers, either closer together or farther apart, over and inside the selection rectangle frame on the displayed image; and
   detecting linear movement of one finger over, outside and in proximity to the selection rectangle frame on the displayed image.

18. The computer program product of claim 12, the method further comprising:
   based on determining a request for dragging the selection rectangle frame, moving the selection rectangle frame over the displayed image in the display frame following a determined movement of a finger swipe or drag in the selection rectangle frame, and resizing the selection rectangle frame while maintaining the selection rectangle frame within boundaries of the display frame.

19. A portable electronic device, comprising:
   a display;
   a user input interface device for at least detecting gestures;
   memory; and
   at least one processor, communicatively coupled with the display, the user input interface device, and the memory, the at least one processor being configured with instructions for performing a method comprising:
      displaying, with at least one processor, an image in a display frame on a display;
      receiving a selection of a portion of the displayed image in a selection rectangle frame over the displayed image, based on detecting a first gesture;
      determining a request for rotation of the selection rectangle frame, based on detecting a second gesture; and
      based on the determined request for rotation, rotating the selection rectangle frame on the displayed image and resizing the selection rectangle frame while maintaining it within the boundaries of the displayed image in the display frame.

20. The portable electronic device of claim 19, the at least one processor being configured with instructions for performing the method further comprising:
   determining a request for crop of the portion of the displayed image in the displayed selection rectangle frame; and
   based on determining the request for crop, cropping the portion of the displayed image in the displayed selection rectangle frame.

\* \* \* \* \*